United States Patent Office 3,414,390
Patented Dec. 3, 1968

3,414,390
PHOSPHORUS TRIOXIDE METAL COMPOUNDS
Jean G. Riess, Brentwood, and John R. Van Wazer, Ladue, Mo., assignors to Monsanto Company, St. Louis, Mo., a corporation of Delaware
No Drawing. Filed June 21, 1965, Ser. No. 465,743
14 Claims. (Cl. 23—315)

ABSTRACT OF THE DISCLOSURE

The present invention relates to new chemical compounds which embody a phosphorus trioxide moiety, combined with metal complexes such as carbonyls, wherein metal atoms are bridged by P—O—P linkages. The compounds of the invention are useful as gasoline additives.

---

The present invention relates to new chemical compounds, the process for making such compounds and also certain applications thereof.

It is an object of the invention to provide new chemical compounds which embody a phosphorus trioxide moiety, $P_4O_6$, combined with metal complexes in a very stable form. It is also an object of the invention to provide such compounds in the form of polymers. It is likewise an object of the invention to provide novel catalysts, insecticides and other technical products based upon the aforesaid new compounds.

Another object of the invention is to provide novel metal-containing compositions which are useful as gasoline additives to provide anti-knock activity and to inhibit the deposition of solid combustion residues in the cylinders of internal combustion engines.

The new compounds of the present invention are coordination compounds which in a preferred embodiment of the invention are obtained by ligand-displacement reactions of phosphorus trioxide, $P_4O_6$, with various metal complexes such as carbonyls to give compounds having a three-dimensional molecular form. These compounds all involve an elaborated bird-cage molecular structure, which for the first time provides a complex having metal-phosphorus bonds wherein metal atoms are also bridged by P—O—P linkages, and also the first covalent coordination compounds built around a tetradentate phosphorus compound.

The general formula for the compounds of the present invention is expressed as $[P_4O_6]_a M_b L_c$ where M is at least one metal selected from the group consisting of nickel, cobalt, iron, manganese, chromium, vanadium, titanium, palladium, rhodium, ruthenium, tellurium, molybdenum, platinum, iridium, osmium, rhenium, and tungsten (including mixed compounds which have more than one metal), L is a coordinating ligand selected from the group consisting of at least one of CO, $PF_3$, $PCl_3$, $PBr_3$, $PR_3$, $P(OR)_3$, $AsR_3$, NCO, CN— and Q, where Q is an unsaturated group such as cyclopentadiene, benzene, butadiene and other dienes and acetylene, and arenes such as benzene, biphenyl, and naphthalene; R is a hydrocarbyl radical of from 1 to 20 carbon atoms including alkyl, cycloalkyl, aryl and alkylaryl radicals; $a$ is a number lying in the continuous range of numbers from 1 to $6b$, representative of the overall proportion of $P_4O_6$ moieties present in the compound; $b$ is a number lying in the continuous range of numbers from 1 to 4, and $c$ is a number lying in the continuous range of numbers from 1 to $6b$.

In addition to the coordinating ligands discussed above, other additive substituents may be present on the metal, although not necessarily participating in the reaction with $P_4O_6$. Such additive substituents include halogens such as fluorine, chlorine, bromine and iodine; hydrocarbyl radicals of from 1 to 20 carbon atoms such as alkyl groups such as methyl, ethyl, propyl, butyl up to eicosyl radicals and their isomers, and unsaturated analogues; aryl groups such as benzene, naphthalene; hydrogen; and water, e.g. as hydrides and hydrates.

The above general formula applies to a wide range of structures going from molecules based on a single $P_4O_6$ moiety and a single metal atom to infinite-network polymers. The simpler compounds, which are molecular structures centered on either a single $P_4O_6$ moiety or a single metal atom or a single group of metal atoms bridged only by the L ligands, are represented by the following general formula:

$$[P_4O_6]_a[M_bL_c]_d$$

where $a$ is a whole number from 1 to $6b$; $b$ is a whole number from 1 to 4; $c$ is a whole number from 1 to $6b$, $d$ is a whole number from 1 to $4a$; and

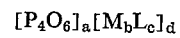

is equal to the usual coordination number of the metal.

More specific formulas within the generic formula are shown below, utilizing nickel as a representative metal, which is combined with carbonyl as a representative ligand. Such a group is described by the formula:

where $i$ is a number lying in the continuous range of numbers from 1 to 4, and $j$ is a number also lying in the continuous range of numbers from 1 to 4. When $i$ is a whole number from 1 to 4 and $j$ is a whole number from 1 to 4 the products include non-polymeric species; for example when $i$ is one and $j$ is four, the compound is P, P′, P″, P‴-tetrakistricarbonylnickel (tetraphosphorus hexaoxide). When $i$ and $j$ are each in the continuous range of 1.8 to 4, polymeric products result, as discussed below.

The usual coordination numbers in the zero-oxidation state of the metals contemplated in the present invention are summarized below:

| Metal | Coordination number |
| --- | --- |
| Nickel | 4 |
| Cobalt | 4.5 |
| Iron | 5 |
| Manganese | 5.5 |
| Chromium | 6 |
| Vanadium | 6.5 |
| Titanium | 8 |
| Palladium | 4 |
| Rhodium | 4.5 |
| Ruthenium | 5 |
| Tellurium | 5.5 |
| Molybdenum | 6 |
| Platinum | 4 |
| Iridium | 4.5 |
| Osmium | 5 |
| Rhenium | 5.5 |
| Tungsten | 6 |

A given metal may have several coordination numbers as exemplified by iron in the compounds $Fe(CO)_5$, $Fe_2(CO)_9$, and $Fe_3(CO)_{12}$ or may be used in oxidation states other than zero, for example in the compounds $Co^{II}(CN)^{3-}{}_5$ and $HCo^{III}(CN)^{3-}{}_5$. A general formula $M_bL_c$ should be employed for the $P_4O_6$-free complexes which may be used as starting materials in the preparation of the compounds of this invention.

It has been found that phosphorus trioxide, $P_4O_6$, is an unusual ligand in coordination chemistry since it is a bird-cage molecule in which the four phosphorus atoms bearing pairs of electrons, which may be donated to the metal, are situated at the corners of a large tetrahedral structure. This means that chelation of a single atom by this tetradentate ligand cannot occur although phosphorus trioxide can bind as many as four metal atoms per $P_4O_6$.

Other examples of the group of compounds coming under the specific formula set forth above, and having varied degrees of metal substitution upon the phosphorus trioxide, $P_4O_6$, core are shown in the following table: wherein the oxygen atoms between phosphorus atoms are omitted as are the CO groups on each Ni atom. In the nuclear-magnetic-resonance (NMR) data, the $P^{31}$ chemical shifts, $\Delta$, in units of p.p.m. are referenced to $PO_4H_3$, 85%; and the indirect spin-spin coupling constants, J, are given in c.p.s. units. The single or doubly underlined phosphorus atoms are those serving as a ligand by donating their normally unshared pair of electrons to a nickel atom.

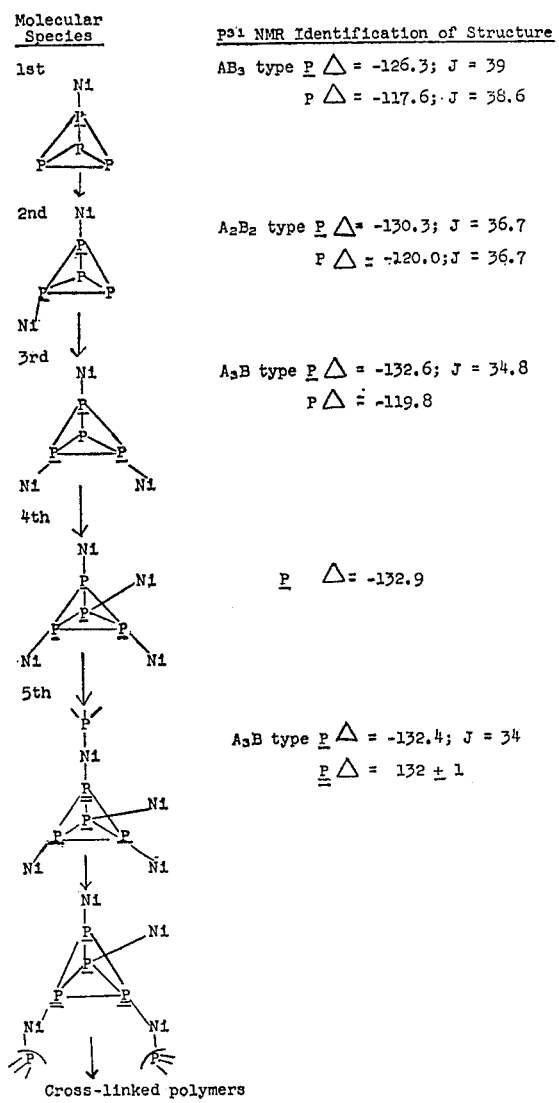

Cross-linked polymers

When the molar proportion of nickel carbonyl relative to phosphorus trioxide is varied between 0.25 and 3.9, the products obtained are polymeric in nature, being produced as hard clear gels instead of as white powders. For example, the product obtained when using 1 mole of nickel carbonyl per mole of phosphorus trioxide is a highly cross-linked polymer for which there is no structurally nondisruptive (i.e. nonreactive) solvent. Thus, the family of compounds obtained by reacting nickel carbonyl with the phosphorus trioxide bird-cage molecule shows two gel points, with infinite-network polymers in the approximate composition range between $Ni/P_4O_6$ mole ratios of 0.25 and 3.9.

A typical group of polymeric compounds can be represented by the formula $[P_4O_6]_i[Ni(CO)_{4-j}]$ where $i$ is a number lying in the continous range of numbers from 1.8 to 4, and $j$ is a number also lying in the continuous range of numbers between 1.8 to 4. These are made by the method described herein.

The preferred method of preparation of the compounds of the present invention is to mix together phosphorus trioxide with the complex previously formed between the metal, M, and the ligands L, using the approximate stoichiometric proportion of phosphorus trioxide and the M-L complex to obtain the desired molecular structure in maximum or near maximum yield.

A general method applicable with the compounds of the present invention is the replacement of L ligands, using the above nomenclature, by phosphorus atoms of the $P_4O_6$ molecule in metal complexes of the type $M_bL_c$ where M and L are defined above; $b$ is a whole number from 1 to 4, and $c$ is a whole number from 1 to 6$b$.

The use of an excess of either the phosphorus trioxide, $P_4O_6$, or the metal component aids in carrying the reaction to the desired species in which the metal is completely substituted by $P_4O_6$, or in which $P_4O_6$ is completely coordinated to metal. The temperature is not a critical variable and may be maintained in the range of from $-20°$ C. to $150°$ C.; a preferred range for nickel compounds being $-20°$ C. to $50°$ C. The pressure is likewise not critical, although atmospheric pressure or vacuum conditions may be desirable.

The present process may be conducted without the use of a solvent since phosphorus trioxide is easily liquified (i.e. melting at 23.8° C.). Consequently this reactant may also be used as the liquid reaction medium. However, if it is desired to employ a solvent to promote the degree of mixing of the reagents and to improve the speed of quenching the reactants, various organic solvents may be employed, for example saturated hydrocarbons such as pentane, n-octane or dodecane, cyclohexane, ethers such as diethyl ether, or chloro-carbon solvents such as chloroform or carbon tetrachloride. The proportion of solvent is not critical.

The control of the reaction to achieve the desired degree of substitution is effectuated by regulating the reaction on the basis of the proportion of the evolved moiety, L, of the reactant being substituted by the phosphorus trioxide core. Consequently it is desirable to stop the reaction at the desired point such as by chilling the reaction mixture. For example the addition of the metal carbonyl such as iron pentacarbonyl to the phosphorus trioxide, $P_4O_6$, results in the evolution of carbon monoxide in the proportion of one mole of the gas for each mole of carbonyl substituted by a phosphorus of the phosphorus trioxide on an iron atom.

The product obtained in the case of polymers has little if any unreacted starting materials present. In the case of the crystalline stoichiometric products, a washing-filtration step serves to remove the crystals from unreacted components. Washing the crystals with a solvent such as dry pentane removes unreacted metal carbonyl.

The pure compounds show good resistance to thermal decomposition and against reaction with moist air.

When other metal ligands such as those containing $PF_3$, $PCl_3$, $PBr_3$, $PR_3$, $P(OR)_3$, $AsR_3$, NCO, CN and Q where Q is an unsaturated group such as cyclopentadiene, benzene, butadiene and other dienes and acetylene; and arenes such as benzene, biphenyl, and naphthalene; R is a hydrocarbyl radical of from 1 to 20 carbon atoms, are used, the corresponding respective moieties are evolved moieties for example $PF_3$ from $W(PF_3)_6$.

The use of fractional crystallization is a useful method for the separation of the reaction products from the reaction mixture; this procedure is also useful for the separation of compounds having differing degrees of substitution. Other methods which may be used to obtain the products of the present invention include solvent extraction such as by the use of saturated hydrocarbons, e.g. pentane as the solvent.

An alternate course for preparing certain of the compounds of this invention is to combine the selected proportions of phosphorus trioxide, $P_4O_6$, and the other ligand, L, in free or uncombined form and the metal, M, as the element, and to react them under pressure (for example, 100 atmospheres) using sufficient time so that the reaction can be carried out at 50° C. or lower. Another related embodiment of this invention is to recycle the $P_4O_6$ and the free ligand, L, over the finely divided metal, collecting the compound of this invention from the recycled stream as it is formed. Similarly, the law of mass action may be invoked to displace one ligand by another simultaneous to the production of the compounds of this invention. For example, nickel carbonyl, an excess of trimethylphosphine and $P_4O_6$ may be reacted so as to produce compounds of the type $$P_4O_6\{Ni[P(CH_3)_3]_3\}_2$$

and, by a related preparative approach, mixed-ligand structures such as $P_4O_6\{Ni(CO)_2[P(CH_3)_3]\}_2$.

Application of the law of mass action permits the preparation of one compound of this invention from another. For example, the reaction of the following equation has been carried out in a few minutes at room temperature in an equal volume of chloroform:

$$P_4O_6[Ni(CO)_3]_4 + 3P_4O_6 \rightarrow 4P_4O_6[Ni(CO)_3]$$

Likewise, combining equimolar amounts of $$P_4O_6[Ni(CO_3)_3]_4$$

with $[P_4O_6]_3Ni(CO)$ has been found to give the infinite network polymer exhibiting this stoichiometry. Similar operations may be performed with metals other than nickel and ligands other than carbonyl.

The following examples illustrate specific embodiments of the present invention.

Example 1

P,P',P'',P''' - tetrakistricarbonylnickel(tetraphosphorus hexaoxide) is prepared by mixing together 1.1 g. (5 millimoles) of liquid phosphorus trioxide, $P_4O_6$, and 4.08 g. (6 millimoles) of liquid nickel carbonyl at room temperature, under a nitrogen atmosphere.

It is found that carbon monoxide is evolved as a gas as substitution takes place upon the $P_4O_6$ core. When 4 moles of carbon monoxide per mole of the $P_4O_6$ have been evolved, the reaction is quenched by the use of a large excess of Dry Ice-cooled, dry pentane into which the crude crystalline product is crushed with agitation. A washing step is then employed using Dry Ice-cooled, dry pentane to separate the insoluble product, from unreacted nickel carbonyl. The product is then filtered and recrystallized from pentane to obtain a white powder which is stable in air, but slowly decomposes with the evolution of carbon monoxide at 78° C. The product $$[P_4O_6][Ni(CO)_3]_4$$

has the empirical formula $C_{12}Ni_4O_{18}P_4$. The product is soluble in saturated hydrocarbons such as pentane, octane, dodecane and chlorocarbon solvents such as chloroform and carbon tetrachloride, methanol, acetone, diethyl ether, and ethyl acetate.

The three-dimensional structure of the product is shown below:

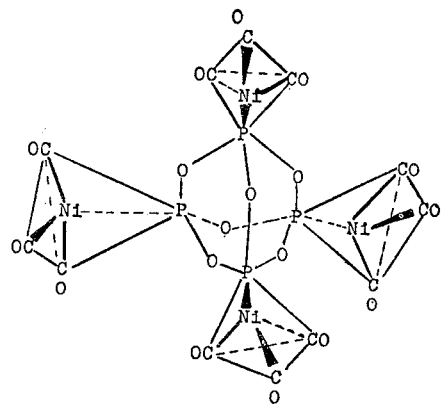

When the preparation is repeated using molar proportions of from 0.25 to 3.9 for the $Ni(CO)_4/P_4O_6$ components, the products are infinite-network, polymeric glasses which have compositions within the generic formula $$[Ni(CO)_{4-i}]_j(P_4O_6)_i$$

where $i$ is a number having values in the continuous range of numbers from 1.8 to 4, $j$ is another number also having values in the continuous range from 1.8 to 4.

The structure of the product P,P',P'',P'''-tetrakistricarbonylnickel (tetraphosphorus hexaoxide) is proven by the following:

(A) Nuclear magnetic resonance data. A single, $P^{31}$ NMR peak at −132.9 p.p.m. for chloroform solutions. This is 10 p.p.m. downfield from $P_4O_6$ in accordance with the decrease of electron density on the phosphorus atoms in the complex;
(B) The proper elemental analysis:
(C) A partial structure determination based on the X-ray powder diffraction pattern (one mole per unit cell in the simple cubic system with $a_0$=8.81 A.); and
(D) The infrared stretching frequencies for the carbonyl which are close to those of the $Ni(CO)_4$ itself.

Additional structural evidence is obtained by following kinetically the formation of P,P',P'',P'''-tetrakistricarbonylnickel(tetraphosphorus hexaoxide) by $P^{31}$ NMR. In this case, all of the intermediate species having from 1 to 3 tricarbonylnickel groups per $P_4O_6$ molecule are observed to form and maximize successively. These intermediate compounds exhibit the correct splitting patterns and reasonable NMR chemical shifts and splitting constants for Ni—P bonding at the various :P≡ sites of $P_4O_6$. Thus, the overall $P^{31}$ NMR spectrum at the beginning of the reaction exhibits the single, sharp peak corresponding to $P_4O_6$, with successive spectra becoming more and more complex (with as many as 20 first-order resonances showing up). Then, as the reaction proceeds further, the spectra become more and more simple, until only the single sharp resonance for the $P_4O_6[Ni(CO)_3]_4$ molecule remains.

EXAMPLE 2

An example of an iron carbonyl-$P_4O_6$ complex results from the mixing together of one millimole of iron carbonyl with one millimole of phosphorus trioxide, $P_4O_6$, and the mixture being heated to 100° C. for 2 days. The structural formula for the product is:

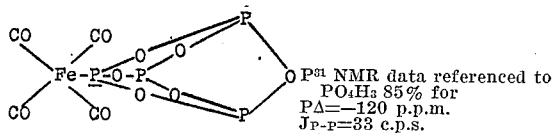

which has the empirical formula $$P_4O_6Fe(CO)_4$$

EXAMPLE 3

An example of chromium carbonyl-$P_4O_6$ complex results from the mixing and heating together at 100° C. of one millimole of chromium carbonyl with two millimoles of phosphorus trioxide, $P_4O_6$. The structural formula of the product is:

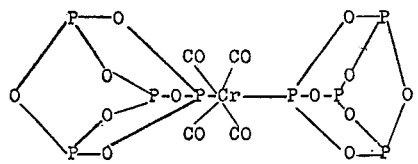

which has the empirical formula $(P_4O_6)_2Cr(CO)_4$.

Example 4

An example of a pi-complex compound with titanium results from the mixing and heating together at 100° C. of one millimole of dicyclopentadiene-titanium dichloride, with ten millimoles of phosphorus trioxide, $P_4O_6$ as the reagent and solvent. The structural formula of the product is

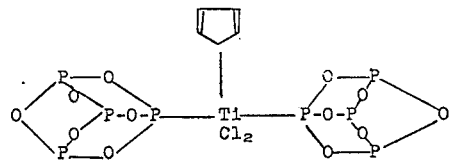

which has the empirical formula

$(P_4O_6)_2TiCl_2(C_5H_5)$

Example 5

A mixed metal complex is obtained by mixing and heating together at 30° C. one millimole of nickel carbonyl and one millimole of the product of Example 2. The product has the structural formula

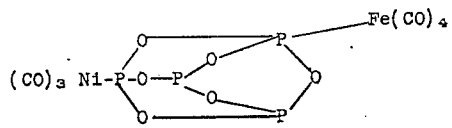

which has the empirical formula

$(P_4O_6)[Ni(CO)_3][Fe(CO)_4]$

When the reagents are combined in proportions corresponding to the metal-$P_4O_6$ mole ratio of less than 4, it is found that bridging of $P_4O_6$ molecules by the metal atoms such as those of nickel described above occurs. In this situation, cross-linked polymers are obtained as glasses. In this case, the first NMR pattern to appear in the $P^{31}$ NMR spectrum is that of $P_4O_6[Ni(CO)_3]_4$ which is the same pattern that first shows up when the nickel carbonyl is present in large excess. However, succeeding reactions leads to replacement of up to three of the carbonyl groups on a given nickel by $P_4O_6$ molecules, with each carbonyl being replaced by a single $P_4O_6$. Successive replacement of carbonyl groups on a given nickel is found to require longer periods of time than the successive attachment of tricarbonyl nickel groups to a given $P_4O_6$ molecule.

The metal compounds of the present invention have utility in a number of relationships, for example as catalysts, anti-knock agents, insecticides and as a source of finely divided metals. In catalysis the fact that these compounds are soluble in a variety of organic solvents such as hydrocarbons, e.g. heptane, ethers, such as diethyl ether, aromatic hydrocarbons, e.g. benzene and chlorocarbon solvents such as chloroform, permits the use of the catalyst in a homogeneous system. The nickel and cobalt compounds are useful catalysts in the carbonylation reaction of olefins having up to 14 carbon atoms to give aldehydes and alcohols which have one more carbon atom than the olefins. In such processes the said nickel or cobalt containing compounds are used in the proportion of 0.5 to 10% by weight of the olefin feedstock, with the reaction being carried out in the superatmospheric pressure range, such as from 10 to 250 atmospheres and at temperatures in the range of from 120° C. to 150° C. in this way the reaction of propylene with carbon monoxide and hydrogen over P,P',P'', P'''-tetrakistricarbonylnickel(tetraphosphorus hexaoxide) yields butyraldehyde and butanol.

Other applications of the compounds of the present invention are the catalysis of the polymerization of ethylenic compounds to obtain polymers of higher molecular weight, and also as hydrogenation catalysts for example for the saturation of olefinic and acetylenic compounds as well as the hydrogenation of —CO bonds to obtain alcohols.

The metal containing compounds defined above also provide a convenient source for active forms of such metals in very finely divided form as a result of the thermal decomposition of the compounds. For example, finely divided iron or nickel powder is obtained by heating the respective iron or nickel compounds described above to a temperature of about 300° C., or by admixing the compounds with water to release the metal by hydrolysis.

What is claimed is:

1. Compounds having the formula

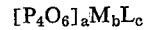

$[P_4O_6]_aM_bL_c$ where M is at least one metal selected from the group consisting of nickel, cobalt, iron, manganese, chromium, vanadium, titanium, palladium, rhodium, ruthenium, tellurium, molybdenum, platinum, iridium, osmium, rhenium and tungsten; L is a coordinating ligand selected from the group consisting of at least one of CO, $PF_3$, $PCl_3$, $PBr_3$, $PR_3$, $P(OR)_3$, $AsR_3$, NCO, CN, unsaturated groups having from 1 to 20 carbon atoms; R is a hydrocarbyl radical of from 1 to 20 carbon atoms; $a$ is a number lying in the continuous range of numbers from 1 to $6b$, representative of the proportion of $P_4O_6$ moieties present in the compound; $b$ is a number lying in the continuous range of numbers from 1 to 4; and $c$ is a number lying in the continuous range of numbers from 1 to $6b$.

2. Compounds having the formula

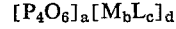

$[P_4O_6]_a[M_bL_c]_d$ where M is at least one metal selected from the group consisting of nickel, cobalt, iron, manganese, chromium, vanadium, titanium, palladium, rhodium, ruthenium, tellurium, molybdenum, platinum, iridium, osmium, rhenium and tungsten; L is a coordinating ligand selected from the group consisting of at least one of CO, $PF_3$, $PCl_3$, $PBr_3$, $PR_3$, $P(OR)_3$, $AsR_3$, NCO, CN, unsaturated groups having from 1 to 20 carbon atoms; R is a hydrocarbyl radical of from 1 to 20 carbon atoms; $a$ is a whole number from 1 to $6b$, representative of the proportion of $P_4O_6$ moieties present in the compound; $b$ is a whole number from 1 to 4; $c$ is a whole number from 1 to $6b$; $d$ is a whole number from 1 to $4a$, and $$\frac{ad+cd}{bd}$$

is equal to the usual coordination number of the metal.

3. Process for the production of

$[P_4O_6]_aM_b(L)_c$ where M is at least one metal selected from the group consisting of nickel, cobalt, iron, manganese, chromium, vanadium, titanium, palladium, rhodium, ruthenium, tellurium, molybdenum, platinum, iridium, osmium, rhenium and tungsten; L is a coordinating ligand selected from the group consisting of at least one of CO, $PF_3$, $PCl_3$, $PBr_3$, $PR_3$, $P(OR)_3$, $AsR_3$, NCO, CN, unsaturated groups having from 1 to 20 carbon atoms; R is a hydrocarbyl radical of from 1 to 20 carbon atoms; $a$ is a number lying in the continuous range of numbers from 1 to $6b$; representative of the proportion of $P_4O_6$ moieties present in the compound; $b$ is a number lying in the continuous range of numbers from 1 to 4; $c$ is a number lying in the continuous range of numbers from 1 to $6b$; which comprises admixing in an inert atmosphere the approximately stoichiometric proportions of a metal complex, $M_bL_c$, with phosphorus trioxide; evolving the stoichiometric proportion of the L moiety, maintaining the temperature in the range of $-20°$ C. to $150°$ C., and then quenching the reaction mixture at a temperature sufficiently low to substantially halt the evolution of L.

4. Process for the production of

where M is at least one metal selected from the group consisting of nickel, cobalt, iron, manganese, chromium, vanadium, titanium, palladium, rhodium, ruthenium, tellurium, molybdenum, platinum, iridium, osmium, rhenium and tungsten; L is a coordinating ligand selected from the group consisting of at least one of CO, $PF_3$, $PCl_3$, $PBr_3$, $PR_3$, $P(OR)_3$, $AsR_3$, NCO, CN, unsaturated groups having from 1 to 20 carbon atoms; R is a hydrocarbyl radical of from 1 to 20 carbon atoms; $a$ is a whole number from 1 to $6b$; representative of the proportion $P_4O_6$ moieties present in the compound; $b$ is a whole number from 1 to 4; $c$ is a whole number from 1 to $6b$; $d$ is a whole number from 1 to $4a$; and $$\frac{ad+cd}{bd}$$

is equal to the usual coordination number of the metal; which comprises admixing in an inert atmosphere the approximately stoichiometric proportions of a metal complex, $M_bL_c$ with phosphorus trioxide; evolving the stoichiometric proportion of the L moiety, maintaining the temperature in the range of $-20°$ C. to $150°$ C., and then quenching the reaction mixture at a temperature sufficiently low to substantially halt the evolution of L.

5. Process for the production of

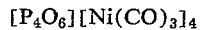

which comprises admixing approximately 4 moles of nickel carbonyl and one mole of phosphorus trioxide, $P_4O_6$, in the presence of an inert atmosphere at a temperature in the range of from $-20°$ C. to $50°$ C., evolving 4 moles of carbon monoxide per mole of phosphorus trioxide, quenching the reaction mixture at a temperature sufficiently low to halt the evolution of carbon monoxide, and thereafter removing the said compound from the reaction mixture.

6. Compounds having the formula

where $i$ is a number lying in the continuous range of numbers from 1 to 4, and $j$ is a number also lying in the continuous range of numbers from 1 to 4.

7. Polymeric compounds having the formula

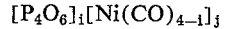

where $i$ is a number lying in the continuous range of numbers from 1.8 to 4, and $j$ is a number also lying in the continuous range of numbers from 1.8 to 4.

8. Compounds having the general formula

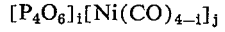

where $i$ is a whole number from 1 to 4 and $j$ is a whole number from 1 to 4.

9. Compound having the formula

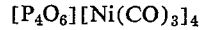

10. Compound having the formula

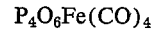

11. Compound having the formula

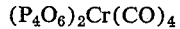

12. Compound having the formula

13. Compound having the formula

14. Compounds made by replacing ligands L of a starting metal complex, $M_bL_c$ by phosphorus atoms of the $P_4O_6$ molecule, while retaining its original atomic arrangement, where M is selected from the group consisting of nickel, cobalt, iron, manganese, chromium, vanadium, titanium, palladium, rhodium, ruthenium, tellurium, molybdenum, platinum, iridium, osmium, rhenium and tungsten; L is a coordinating ligand selected from the group consisting of at least one of CO, $PF_3$, $PCl_3$, $PBr_3$, $PR_3$, $P(OR)_3$, $AsR_3$, NCO, CN, unsaturated groups having from 1 to 20 carbon atoms, halogens, hydrocarbyl radicals, hydrogen and water; R is a hydrocarbyl radical of from 1 to 20 carbon atoms; $b$ is a whole number from 1 to 4; and $c$ is a whole number from 1 to $6b$.

References Cited

UNITED STATES PATENTS 2,865,707   12/1958   Hogsed _____ 23—203

FOREIGN PATENTS 1,072,244   12/1959   Germany.

EARL C. THOMAS, *Primary Examiner.*

H. S. MILLER, *Assistant Examiner.*

PO-1050
(5/69)

UNITED STATES PATENT OFFICE
CERTIFICATE OF CORRECTION

Patent No. 3,414,390          Dated December 3, 1968

Inventor(s) Jean G. Riess et al

It is certified that error appears in the above-identified patent and that said Letters Patent are hereby corrected as shown below:

Column 4, line 12, the formula "$[P_4O_6]_i[Ni(CO)_{4-j}$" should read -- $[P_4O_6]_i[Ni(CO)_{4-i}]_j$ --

SIGNED AND
SEALED
FEB 17 1970

(SEAL)
Attest:

Edward M. Fletcher, Jr.
Attesting Officer

WILLIAM E. SCHUYLER, JR.
Commissioner of Patents